Figure 1:
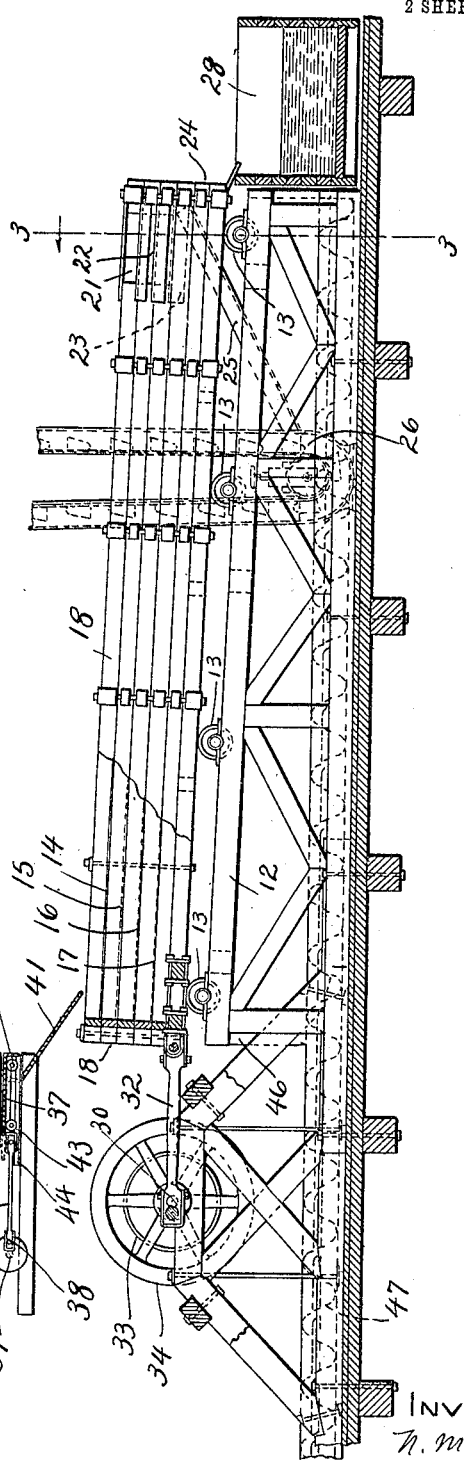

No. 819,889. PATENTED MAY 8, 1906.
N. M. JONES.
APPARATUS FOR ASSORTING PULP WOOD CHIPS.
APPLICATION FILED APR. 27, 1905.

2 SHEETS—SHEET 1.

WITNESSES:
INVENTOR:
N. M. Jones

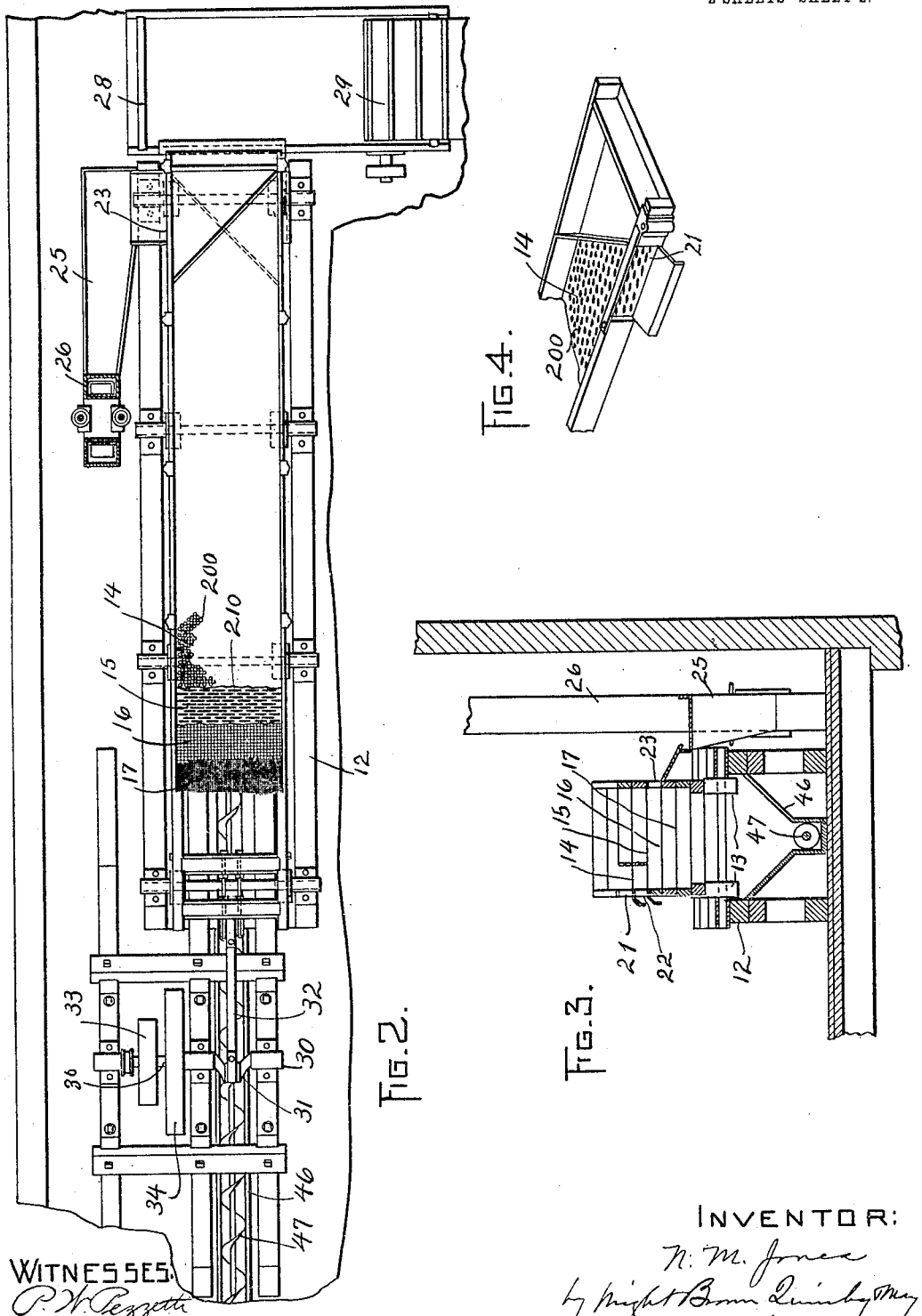

UNITED STATES PATENT OFFICE.

NATHANIEL M. JONES, OF LINCOLN, MAINE.

APPARATUS FOR ASSORTING PULP-WOOD CHIPS.

No. 819,889.      Specification of Letters Patent.      Patented May 8, 1906.

Application filed April 27, 1905. Serial No. 257,649.

*To all whom it may concern:*

Be it known that I, NATHANIEL M. JONES, of Lincoln, in the county of Penobscot and State of Maine, have invented certain new and useful Improvements in Apparatus for Assorting Pulp-Wood Chips, of which the following is a specification.

This invention relates to the preparation of wood chips for the process of making sulfite pulp, the said process including the cooking of the chips in a digester.

The object of the invention is, first, to enable the mass of chips and other fragments produced by the action of the chipping apparatus on a log to be rapidly, continuously, and economically assorted into grades according to size, said grades including large pieces or slivers of clear wood which are too large for proper reduction in the digester, butts and other pieces which are not only too large, but carry matter unsuitable for pulp, such as bark and knot-wood, clearwood chips of the maximum size for cooking in the digester, and smaller chips which are of proper size for cooking in the digester and are mixed with correspondingly - reduced waste matter in the form of dirt, reduced bark, &c., and, secondly, to enable the smaller clear-wood chips and the waste matter mixed therewith to be separated in accordance with their respective specific gravities.

To this end the invention consists, first, in an improved method of assorting chips, which consists in subdividing the chips by agitation and gravitation, due preferably to the action of a tier of screens having openings of different sizes into a plurality or grades according to the size of the chips, these grades including the slivers which are too large for cooking and require further reduction, butts and pieces which are not only too large, but require separation from waste matter which they carry, clear-wood chips of the maximum size suitable for cooking, and smaller clear-wood chips which are mixed with reduced waste matter, and then causing the clear-wood chips of the smallest size to separate from the waste matter mixed therewith in accordance with the respective specific gravities, this separation being preferably effected by putting the chips of the smallest size into a body of liquid of greater specific gravity than the clear-wood chips and of less specific gravity than the waste matter, the clear-wood chips floating and the waste matter sinking in said liquid, after which the floating clear-wood chips may be removed from the liquid. By thus assorting the chips into grades, including chips which are of excessive size, chips which are of a suitable although maximum size and are free from waste matter, and chips of smaller size which are mixed with waste matter, I am enabled to rapidly dispose of the entire mass of chips without requiring the use of an unduly bulky apparatus, such as would be required if all the chips were put into a body of liquid for separation of the elements of the mass in accordance with their respective specific gravities. In other words, I am enabled first to separate the chips and pieces of excessive size from the mass, so that they may be further reduced; secondly, to separate the clear-wood chips of the maximum size required for cooking from the mass and transfer these without further treatment to the digester, and, finally, to separate from the clear-wood chips of the minimum size the reduced waste matter mixed therewith.

The invention also consists in a chip-assorting apparatus organized to practice the above-described method and comprising a mechanical separator organized to subdivide chips into a plurality of grades according to their size and a hydraulic separator which receives the chips of the smallest size and the waste matter mixed therewith from the mechanical separator and separates said chips and waste matter in accordance with their respective specific gravities.

Of the accompanying drawings, forming a part of this specification, Figure 1 represents a side elevation of a chip-assorting machine embodying my invention. Fig. 2 represents a top plan view of the same. Fig. 3 represents a section on line 3 3 of Fig. 1. Fig. 4 represents a fragmentary perspective view.

The same reference characters indicate the same parts in all the figures.

In the drawings, 12 represents a supporting-frame having fixed bearings, in which are journaled antifriction rollers or trucks 13, which support a reciprocating mechanical separator. This separator in its preferred form comprises a tier of screens 14, 15, 16, and 17, which are arranged in a vertical series and are contained in a suitable frame 18, which is open at its top and bottom and has closed sides and ends surrounding the screens. The base of said frame rests upon the rollers 13, so that the separator as a whole can be reciprocated on said rollers to cause the agitation of chips, &c., resting upon the screens. The openings in the top screen are of the maximum size, each of the succeeding screens having smaller openings than the one above it. The top screen 14 is preferably composed of sheet-steel, having circular holes 200, the preferred diameter of which is about one and one-eighth inches. The second screen 15 is also preferably of sheet-steel, its openings being preferably elongated slots 210, each being preferably about three and one-fourth inches long and five-eighths of an inch wide. The slots preferably extend crosswise of the screen, as shown in Fig. 2. The third screen 16 is preferably of wire-cloth of about five-eighths of an inch mesh. The fourth screen 17 is preferably of wire-cloth of about three-sixteenths of an inch mesh. The separator is supported in an inclined position, its receiving end, which is located in suitable proximity to the feeding-hopper 20, being higher than its delivering end. Outlets 21 22 23 24 are provided in the frame in position to conduct from the several screens the material which is caused by the reciprocating movement of the separator to move to the lower ends of the screens. The top screen 14 is adapted to arrest the slivers and chips which are too large to be properly cooked, and its outlet 21 delivers said slivers, &c., by themselves, so that they may be carried back to the chipping apparatus or to a special reducing apparatus for further reduction. The screen 15 is adapted to arrest fragments or pieces which while capable of passing through the screen 14 are too large for cooking. These pieces are usually butts and knots which are more suitable for fuel than for pulp, and they are conducted through the outlet 22 for disposal in any desired way. The oblong slots in the screen 15 are adapted to permit the passage through said screen of chips of the maximum size for cooking as well as smaller chips, the chips of maximum size being arrested by the screen 16. The outlet 23 of this screen communicates, through an inclined slide 25, with an elevator 26, having buckets or other carriers adapted to raise the chips to a bin or receptacle from which they may be passed to the digester. The bottom screen 17 arrests the smaller clear-wood chips of suitable size for cooking, and while said screen permits the passage of the more finely reduced waste matter it retains with the smaller clear-wood chips a considerable quantity of partially-reduced waste matter in the shape of bark, dirt, and other foreign matter. The outlet 24 of the bottom screen delivers the smaller clear-wood chips and the waste matter mixed therewith to the hydraulic separator, which comprises a tank 28, containing a body of water or other liquid of greater specific gravity than the clear-wood chips and of less specific gravity than the waste matter, so that the smaller chips and the waste matter are separated in accordance with their respective specific gravities, the clear-wood chips floating on the liquid, so that they may be removed therefrom by a suitable conveyer 29, the chips thus removed being subsequently carried to the digester.

The preferred means for reciprocating the mechanical separator comprise a shaft 30, journaled in fixed bearings on the frame and having a crank 31 and a rod or pitman 32, connecting said crank with the frame 18. The shaft 30 is provided with a pulley 33, which engages a driving-belt, and with a heavy fly-wheel 34, which prevents the jar and vibration which would otherwise attend the reciprocating movement of the mechanical separator.

The feeding-hopper 20 has an outlet 35 in its bottom portion and vertical wings or side pieces 36 at opposite sides of said outlet.

37 represents a slide which is reciprocated under the outlet 35 by suitable means, such as an eccentric wrist-pin 38 on a disk affixed to a rotating shaft 39, and a rod 40, connecting the wrist-pin with the slide 37, the arrangement being such that when the slide is at one extreme of its movement it forms a bottom extending across the space between the side pieces 36 and prevents the direct flow of chips from the hopper, a limited quantity of chips passing through the outlet and being arrested by the slide 37. When the slide is moved backwardly to the position shown in dotted lines in Fig. 1, a part of the material lodging upon it is forced off by the material above it in the hopper and caused to slide down an incline 41 to the higher end of the top screen 14. There is constantly an accumulation of chips on the slide 37, so that when the slide is again moved forward a part of its load is discharged, there being, therefore, a practically continuous discharge to the mechanical separator. The quantity discharged may be regulated by means of an adjustable gate 42, adapted to close the opening 35 to any desired extent. The slide 37 may be provided with rollers or trucks 43, running on tracks 44.

As above stated, one of the grades of chips separated from the others includes only clear-wood chips which are of a suitable although maximum size for cooking in the digester without further treatment—that is, the chips of this grade are free from waste matter. The reason for this is that the action of the crushing-rollers on the stock before it is introduced into the feeding-hopper 20 is such that all knot-wood which is reduced fine enough to be able to reach the screen 16 is, owing to the brittle nature of the knots, reduced fine enough to pass through said screen 16, and the action of said rollers is such that all bark or dirt which reaches the screen 16 will pass through it. Any pieces large enough to have any knot-wood or other undesirable material adhering to it will be arrested before reaching the screen 16. Therefore as long as chipped and crushed stock is being supplied to the apparatus illustrated there will be one continuous grade of clear-wood chips separated from the rest, and simultaneously therewith there will be another continuous supply of clear-wood chips of a smaller grade delivered by the conveyer 29.

I am aware that it is not new to deposit a mass of chips in a tank containing a body of liquid to cause the separation of the chips and the waste matter mixed therewith in accordance with their respective gravities. So far as I am aware, however, I am the first to employ a mechanical separator to subdivide a mass of chips into different grades according to their size, one of the grades containing chips which are suitable for cooking without further treatment, while others are larger and require reduction, and still another is composed of chips of the minimum size and the tailings of the waste matter that is passed through the preceding screens. It will be seen that the mechanical separation renders it necessary to subject to the hydraulic separation only one of the grades resulting from the subdivision in the mechanical separator, so that the capacity of the hydraulic separator may be correspondingly limited. The length of time required to assort the chips and select from the mass those that are suitable for cooking materially reduces the time required in preparing the chips for the digester as compared with a method in which hydraulic separation only is practiced. The reduced waste matter that passes through the bottom screen 17 accumulates in a trough 46, having inclined sides, and a spiral conveyer 47, adapted to conduct the waste matter from the machine. The conveyer 29, which removes the floating chips from the tank 28, may be an endless belt or band having suitable buckets or flanges to engage and raise the chips, the belt being inclined, so that its carrying stretch rises at an incline from the surface of the liquid. The conveyer may be of any other suitable construction, however. It will be seen that two streams of clear-wood chips are simultaneously and continuously delivered, one by the outlet of the screen 16 and the other by the conveyer 29, so that all the chips which are suitable for cooking are quickly separated from the mass.

I claim—

1. A chip-assorting apparatus comprising a mechanical separator organized to subdivide the chips into a plurality of grades according to their size, and a hydraulic separator which receives the chips of the smallest size and the waste matter mixed therewith, from the mechanical separator, and separates said chips and waste matter in accordance with their respective specific gravities.

2. A chip-assorting apparatus comprising a tier of reciprocating graded screens, the openings of each screen being smaller than those of the screen above it, and a hydraulic separator which receives from the lowest screen the chips of the smallest grade, and the waste matter mixed therewith, and separates said chips and waste matter in accordance with their respective specific gravities.

3. A chip-assorting apparatus comprising a tier of reciprocating graded screens, the openings of each screen being smaller than those of the screen above it, each screen having an outlet for the chips arrested by it, a hydraulic separator which receives the chips and waste matter from the outlet of the lowest screen, and separate conductors for removing chips from the outlets of the other screens.

4. In a chip-assorting apparatus, the combination with a screen adapted to arrest cookable clear-wood chips of a maximum size, of an upper screen above it adapted to arrest larger non-cookable pieces, a bottom screen below the clear-wood screen adapted to arrest cookable pieces of minimum size and broken knot-wood, and a tank to receive and assort the matter arrested by said bottom screen.

5. In a chip-assorting apparatus, the combination with a screen adapted to arrest cookable clear-wood chips of a maximum size, of an upper screen above it adapted to arrest larger non-cookable pieces, a bottom screen below the clear-wood screen adapted to arrest cookable pieces of minimum size and broken knot-wood, a tank to receive and assort the matter arrested by said bottom screen, means for conveying the chips from the clear-wood screen, and means for simultaneously conveying the clear-wood chips from the tank, two clear-wood deliveries being simultaneously effected.

6. In a chip-assorting apparatus, the combination with a screen adapted to arrest cookable clear-wood chips of a maximum size, of an upper screen above it adapted to arrest larger non-cookable pieces, a bottom screen below the clear-wood screen adapted to arrest cookable pieces of minimum size and broken knot-wood, a tank to receive and assort the matter arrested by said bottom screen, means for conveying the chips from the clear-wood screen, means for simultaneously conveying the clear-wood chips from the tank, two clear-wood deliveries being simultaneously effected, means for conveying from the upper screen the slivers and butts, and a conveyer for removing the waste matter falling through the bottom screen.

In testimony whereof I have affixed my signature in presence of two witnesses.

NATHANIEL M. JONES.

Witnesses:
C. F. BROWN,
E. BATCHELDER.